United States Patent
Goto et al.

(10) Patent No.: US 12,497,337 B2
(45) Date of Patent: Dec. 16, 2025

(54) METHOD FOR MANUFACTURING METAL-IMPREGNATED CERAMIC FIRED BODY

(71) Applicants: NGK INSULATORS, LTD., Nagoya (JP); NGK ADREC CO., LTD., Mitake-Cho (JP)

(72) Inventors: Sora Goto, Komaki (JP); Shuhei Kuno, Komaki (JP); Hiroomi Matsuba, Mizunami (JP)

(73) Assignees: NGK INSULATORS, LTD., Nagoya (JP); NGK ADREC CO., LTD., Mitake (JP)

(*) Notice: Subject to any disclaimer, the term of this patent is extended or adjusted under 35 U.S.C. 154(b) by 58 days.

(21) Appl. No.: 18/513,979

(22) Filed: Nov. 20, 2023

(65) Prior Publication Data
US 2024/0190779 A1  Jun. 13, 2024

(30) Foreign Application Priority Data
Dec. 8, 2022  (JP) .................. 2022-196607

(51) Int. Cl.
   *C04B 41/45*   (2006.01)
   *C04B 35/565*  (2006.01)
   *C04B 38/00*   (2006.01)
   *C04B 41/00*   (2006.01)
   *C04B 41/50*   (2006.01)
   *C04B 41/85*   (2006.01)

(52) U.S. Cl.
   CPC ........ *C04B 41/4523* (2013.01); *C04B 35/565* (2013.01); *C04B 38/0006* (2013.01); *C04B 38/0096* (2013.01); *C04B 41/0072* (2013.01); *C04B 41/5096* (2013.01); *C04B 41/85* (2013.01)

(58) Field of Classification Search
   CPC .................................... C04B 41/4523
   See application file for complete search history.

(56) References Cited

U.S. PATENT DOCUMENTS

| | | | |
|---|---|---|---|
| 2011/0003138 A1* | 1/2011 | Kienzle | C04B 35/573 428/322.7 |
| 2020/0165169 A1* | 5/2020 | Koga | C04B 35/573 |
| 2020/0399185 A1* | 12/2020 | Ishiguro | C04B 41/87 |
| 2022/0390181 A1 | 12/2022 | Akahani et al. | |

FOREIGN PATENT DOCUMENTS

| | | |
|---|---|---|
| JP | 2017-218342 A | 12/2017 |
| JP | 2019-156683 A | 9/2019 |
| WO | 2011/145387 A1 | 11/2011 |
| WO | 2021/171670 A1 | 9/2021 |

* cited by examiner

*Primary Examiner* — Robert A Vetere
(74) *Attorney, Agent, or Firm* — BURR PATENT LAW, PLLC (57) ABSTRACT

A method for manufacturing a metal-impregnated ceramic fired body includes: a step 1 of contacting a ceramic formed body with a metal in a form of granules, a step 2 of heating the metal at or above a melting point thereof in a state where the metal in the form of granules is in contact with the ceramic formed body so that the ceramic formed body is fired while the metal is impregnated into the ceramic formed body, thereby obtaining a metal-impregnated ceramic fired body.

8 Claims, 3 Drawing Sheets

METHOD FOR MANUFACTURING METAL-IMPREGNATED CERAMIC FIRED BODY

CROSS REFERENCE TO RELATED APPLICATIONS

The present invention claims the benefit of priority to Japanese Patent Application No. 2022-196607 filed on Dec. 8, 2022 with the Japanese Patent Office, the entire contents of which are incorporated herein by reference in its entirety.

FIELD OF THE INVENTION

The present invention relates to a method for manufacturing a metal-impregnated ceramic fired body.

BACKGROUND OF THE INVENTION

A method of manufacturing a metal-impregnated ceramic fired body by firing a ceramic formed body while impregnating it with a molten metal is known. Examples of metal-impregnated ceramic fired bodies include silicon-impregnated silicon carbide. Silicon impregnated silicon carbide is known as a material with high thermal conductivity, low thermal expansion, high strength, heat resistance, and oxidation resistance, and conventionally, it is used for applications such as heat exchangers, heat sinks, members for semiconductor devices, refractory materials, and filters for purifying exhaust gases.

Patent Literature 1 (International Publication No. 2011/145387) describes a method for manufacturing a Si—SiC composite material, characterized in that the method uses a body to be impregnated containing SiC and an impregnating metal supplying body containing Si, at least one of the body to be impregnated and the impregnating metal supplying body containing Al, and the method comprises an impregnation step of impregnating the body to be impregnated with a molten metal containing Si from the impregnating metal supplying body in an inert gas atmosphere at normal pressure and in a temperature range of 1200° C. or higher and 1600° C. or lower. Patent Literature 1 describes that, as a specific impregnation method, a press-molded impregnating metal supplying body is placed on a body to be impregnated, which is a formed body, and heat treatment is performed to melt the impregnating metal supplying body and impregnate the body to be impregnated.

Patent Literature 2 (International Publication No. 2021/171670) describes a method for manufacturing a honeycomb formed body containing Si-impregnated SiC composite material as a main component, and a method of arranging a lump containing metal Si and a honeycomb formed body so as to be in contact with each other and firing them is illustrated.

Patent Literature 3 (Japanese Patent Application Publication No. 2017-218342) describes a method for manufacturing a honeycomb structure, the method comprising a forming step for obtaining a formed body; a degreasing step of removing the organic binder contained in the formed body to obtain a degreased body; and an impregnation step of impregnating a peripheral wall and an interior of partition walls of the degreased body with metallic silicon. Patent Literature 3 describes that in the impregnation step, it is preferable to heat the degreased body in a state in which a lump of metallic silicon is in contact with the degreased body.

Patent Literature 4 (Japanese Patent Application Publication No. 2019-156683) describes the drawbacks of the manufacturing method described in Patent Literature 3 as follows. In the manufacturing method described in Patent Literature 3, the degreased body is impregnated due to the weight of the molten metallic silicon. Therefore, an amount of metallic silicon exceeding the pore volume of the degreased body may be impregnated, and the excessive metallic silicon may hang down from the outer periphery of the honeycomb structure or may bulge into the cells in the honeycomb structure. Therefore, it is difficult for this manufacturing method to ensure stable shape accuracy.

In order to overcome such drawbacks, Patent Literature 4 proposes a method for manufacturing a honeycomb structure, the method comprising an impregnation step of impregnating a honeycomb porous body with a molten metallic silicon through a porous support by heating the inside of a container to a temperature equal to or higher than a melting point of metallic silicon, in a state in which the honeycomb porous body is arranged via the porous support inside the container containing solid metallic silicon.

PRIOR ART

Patent Literature

[Patent Literature 1] International Publication No. 2011/145387
[Patent Literature 2] International Publication No. 2021/171670
[Patent Literature 3] Japanese Patent Application Publication No. 2017-218342
[Patent Literature 4] Japanese Patent Application Publication No. 2019-156683

SUMMARY OF THE INVENTION

As described in Patent Literature 1 to 3, in conventional methods for manufacturing a metal-impregnated ceramic fired body, an impregnation step is carried out by heat-treating in a state in which a ceramic formed body to be impregnated and an impregnating metal supplying formed body are in contact, typically, a state in which the impregnating metal supplying formed body is placed on the ceramic formed body to be impregnated.

However, such an impregnation step requires the provision of the impregnating metal supplying formed body. For this reason, in order to adjust the impregnation amount according to the size and material of the fired body, it is necessary to change the size of the impregnating metal supplying formed body or scrape off unnecessary portions, resulting in an increase of the manufacturing cost. In addition, when the impregnating metal supplying formed body is placed on the ceramic formed body to be impregnated, the height increases. For this reason, when a large number of ceramic formed bodies to be impregnated are loaded on a kiln tool having shelves arranged vertically in a plurality of stages for mass production, the loading efficiency is lowered.

On the other hand, Patent Literature 4 describes the following advantages. In the impregnation step, the honeycomb porous body is impregnated with metallic silicon based on the sucking power of the honeycomb porous body due to capillary action. Therefore, it is unlikely that metallic silicon is impregnated in an amount exceeding the pore volume of the honeycomb porous body. Accordingly, excess metallic silicon hanging down from the outer circumference and bulging into the cells in the honeycomb structure, which makes the cells narrower than the design value, are suppressed. As a result, the shape stability of the honeycomb structure is improved.

However, in the impregnation step described in Patent Literature 4, since the honeycomb porous body (degreased body) is placed on the porous support to suck up the molten metal, the amount of metallic silicon impregnated in the porous support is wasted. Further, although Patent Literature 4 also describes that the amount of metallic silicon contained in the container is, for example, an amount corresponding to the sum of the pore volume of the honeycomb porous body (degreased body) and the pore volume of the support (for example, an amount equivalent to 1.00 to 1.05 times the volume of the above sum), molten metal tends to gather in the porous support due to gravity, and the honeycomb porous body cannot be densified as expected.

The present invention has been made in view of the above circumstances, and in one aspect, an object of the present invention is to provide a method for manufacturing a metal-impregnated ceramic formed body that can contribute to a reduction in manufacturing costs.

As a result of intensive studies aimed at solving the above problems, the inventors of the present invention have found that it is advantageous to carry out the impregnation step in a state in which metal in the form of granules is brought into contact with a ceramic formed body. The present invention has been created based on this knowledge, and is exemplified as below.

[Aspect 1]

A method for manufacturing a metal-impregnated ceramic fired body, comprising:
  a step 1 of contacting a ceramic formed body with a metal in a form of granules,
  a step 2 of heating the metal at or above a melting point thereof in a state where the metal in the form of granules is in contact with the ceramic formed body so that the ceramic formed body is filed while the metal is impregnated into the ceramic formed body, thereby obtaining a metal-impregnated ceramic fired body.

[Aspect 2]

The method according to aspect 1, wherein the ceramic formed body comprises a honeycomb structure portion having an outer peripheral wall and partition walls disposed on an inner peripheral side of the outer peripheral wall and partitioning a plurality of cells forming flow paths from one end surface to another end surface.

[Aspect 3]

The method according to aspect 1 or 2, wherein the metal in the form of granules has a volume-based median diameter (D50) of 100 μm or more when the particle size distribution is measured by a laser diffraction method.

[Aspect 4]

The method according to any one of aspects 1 to 3, wherein the metal-impregnated ceramic fired body has a porosity of 30% or less.

[Aspect 5]

The method according to any one of aspect 1 to 4, wherein the ceramic formed body comprises a hollow portion extending from the one end surface to the other end surface, and the step 1 comprises disposing the metal in the form of granules in the hollow portion of the ceramic formed body.

[Aspect 6]

The method according to aspect 5, wherein the step 2 is performed in a state where the ceramic formed body is placed on a mounting surface of a jig comprising the mounting surface such that a direction in which the hollow portion extends is parallel to a vertical direction.

[Aspect 7]

The method according to aspect 2, or any one of aspects 3 to 6 depending from aspect 2, wherein the step 1 comprising disposing the metal in the form of granules in the cells of the ceramic formed body.

[Aspect 8]

The method according to aspect 7, wherein the step 2 is performed in a state where the ceramic formed body is placed on a mounting surface of a jig comprising the mounting surface such that the direction in which the cells extend is parallel to a vertical direction.

[Aspect 9]

The method according to any one of aspect 1 to 8, wherein the ceramic formed body comprises silicon carbide, and the metal in the form of granules comprises metallic silicon.

[Aspect 10]

The method according to any one of aspect 1 to 9, wherein the metal-impregnated ceramic fired body is a heat exchanger.

According to the method for manufacturing a metal-impregnated ceramic fired body according to one embodiment of the present invention, metal in the form of granules is used as the impregnating metal supply body. Therefore, not only can the work of forming the impregnating metal supply body be omitted, but also the amount required for impregnation can be easily adjusted. In addition, since it is not necessary to place the metal in the form of granules on the ceramic formed body to be impregnated, the height required for loading on a kiln tool in a state in which a large number of ceramic formed body are in contact with the metal in the form of granules for firing can be reduced, and the loading efficiency is also improved.

In the method for manufacturing a metal-impregnated ceramic fired body according to one embodiment of the present invention, impregnation is performed in a state in which the ceramic formed body is brought into contact with the metal in the form of granules. Therefore, there is no need for a porous support as an intermediary as described in Patent Literature 4, and waste of the metal due to impregnation of the support with the metal is eliminated.

Therefore, the method for manufacturing a metal-impregnated ceramic fired body according to one embodiment of the present invention can contribute to a reduction in the manufacturing cost of a metal-impregnated ceramic fired body.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

In one embodiment, the method for manufacturing a metal-impregnated ceramic fired body according to the present invention comprises:

a step 1 of contacting a ceramic formed body with a metal in a form of granules, a step 2 of heating the metal at or above a melting point thereof in a state where the metal in the form of granules is in contact with the ceramic formed body, and firing the ceramic formed body while impregnating the metal into the ceramic formed body, thereby obtaining a metal-impregnated ceramic fired body.

(Step 1)

Figure 1:
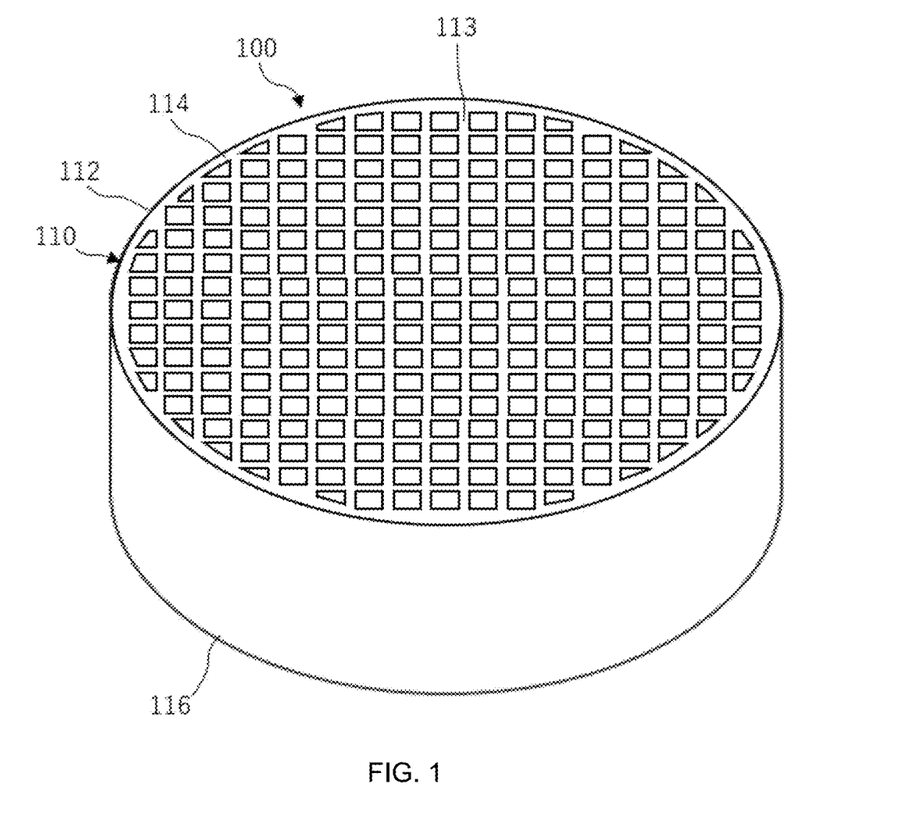
FIG. 1 shows a schematic perspective view of an example of a ceramic formed body.
Figure 2:
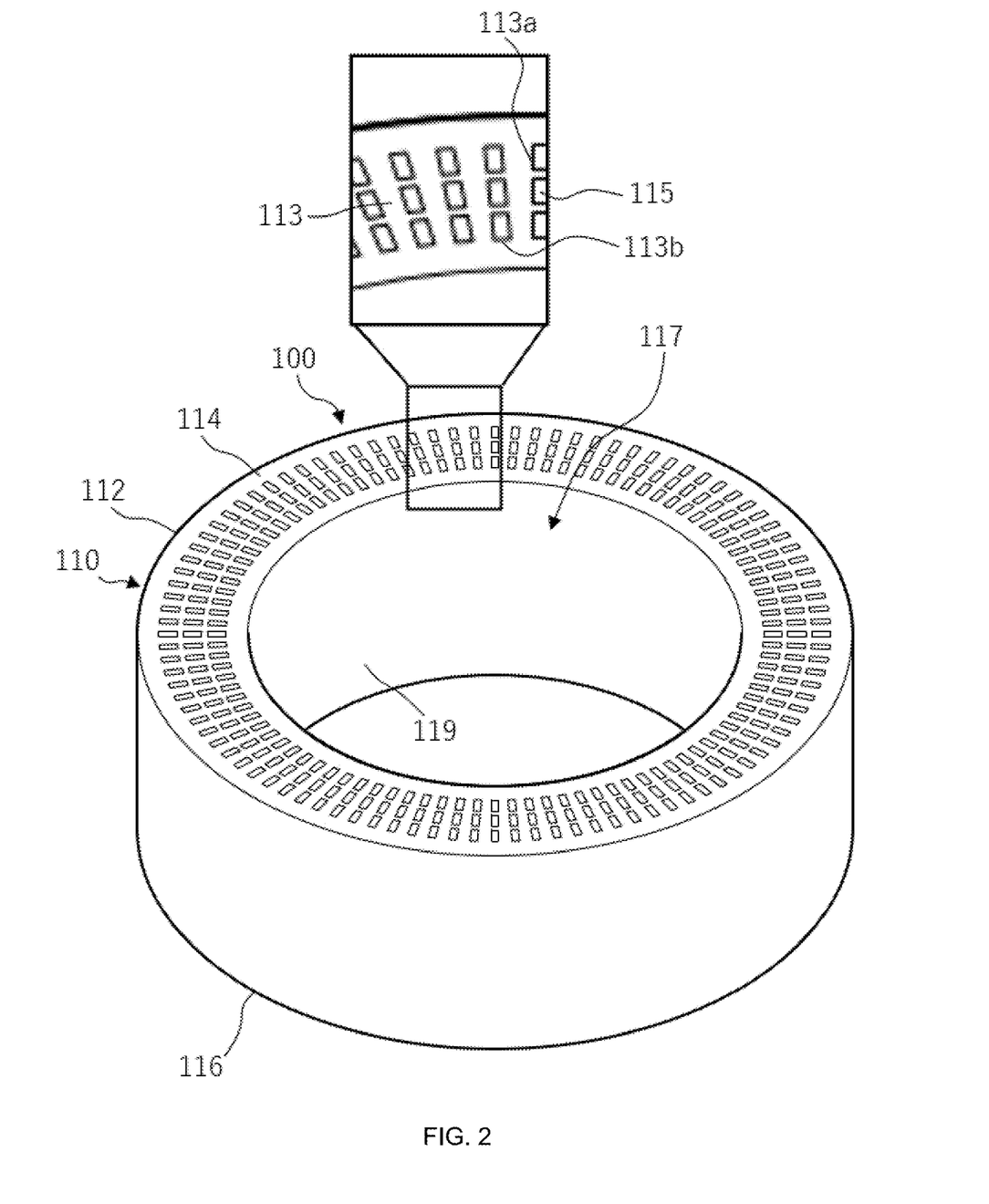
FIG. 2 shows a schematic perspective view and a partially enlarged view of another example of a ceramic formed body.

The step 1 includes contacting the ceramic formed body with a metal in the form of granules. FIG. 1 shows a schematic perspective view of an example of a ceramic formed body 100. FIG. 2 shows a schematic perspective view of another example of the ceramic formed body 100. There are no particular restrictions on the shape of the ceramic formed body 100, but in one embodiment, the ceramic formed body 100 comprises a honeycomb structure portion 110 having an outer peripheral wall 112 and partition walls 113 disposed on the inner peripheral side of the outer peripheral wall 112 and partitioning a plurality of cells 115 forming flow paths from one end surface 114 to the other end surface 116. The external shape of the ceramic formed body 100 is typically pillar-shaped.

The shape of the end surfaces of the ceramic formed body 100 is not limited, and for example, it may be a round shape such as a circular, elliptical, racetrack and elongated circular shape, a polygonal shape such as a triangular and quadrangle shape, and other irregular shapes. The ceramic formed body 100 shown in FIG. 1 has a circular end surface shape and has a cylindrical shape as a whole.

Further, as shown in FIG. 2, the ceramic formed body 100 may have a hollow portion 117 extending from one end surface 114 to the other end surface 116. The hollow portion 117 is preferably formed coaxially with the central axis in the direction in which cells 115 of honeycomb structure portion 110 extend. In this case, the ceramic formed body 100 comprises a honeycomb structure portion 110 having an outer peripheral wall 112, an inner peripheral wall 119, and partition walls 113 disposed between the outer peripheral wall 112 and the inner peripheral wall 119, the partition walls 113 partitioning a plurality of cells 115 forming flow paths from one end surface 114 to the other end surface 116.

The height of the ceramic formed body 100 (the length from the one end surface to the other end surface) is not particularly limited and may be appropriately set according to the application and required performance. There is no particular limitation on the relationship between the height of the ceramic formed body 100 and the maximum diameter of each end surface (referring to the maximum length among the diameters passing through the center of gravity of each end surface of the ceramic formed body 100). Therefore, the height of the ceramic formed body 100 may be longer than the maximum diameter of each end surface, or the height of the ceramic formed body 100 may be shorter than the maximum diameter of each end surface.

The shape of the opening of the cells in the cross-section orthogonal to the direction in which the cells extend is not limited, and it is preferably quadrangle, hexagonal, octagonal, or a combination thereof. Among these, squares and hexagons are preferred. By making the shape of the opening of the cells as described above, the pressure loss when a fluid is allowed to flow through the cells 115 is reduced. In the honeycomb structure portion 110 of the ceramic formed body 100 shown in FIG. 1, most of the cell shapes in the cross-section perpendicular to the flow paths of the cells are square.

In a cross-section perpendicular to the direction in which the cells 115 extend, a plurality of cells 115 may be arranged radially. With such a configuration, the heat of the fluid flowing through the cells 115 can be efficiently transmitted to the outside of the honeycomb structure, which is advantageous when using the metal-impregnated ceramic fired body as a heat exchanger. In the honeycomb structure portion 110 of the ceramic formed body 100 shown in FIG. 2, a plurality of cells 115 are arranged radially. In a cross-section perpendicular to the direction in which the cells 115 extend, each of the plurality of cells 115 of the ceramic formed body 100 shown in FIG. 2 is partitioned by a pair of partition wall surfaces 113a extending from the center side of the honeycomb structure portion 110 toward the outer peripheral side, and the partition wall surfaces 113b on the center side and outer peripheral side connecting the pair of partition wall surfaces 113a. More specifically, each of the plurality of cells 115 of the ceramic formed body 100 shown in FIG. 2 is partitioned by a pair of linear partition wall surfaces 113a extending from the center side of the honeycomb structure portion 110 toward the outer peripheral side, and a pair of concentric arc partition wall surfaces 113b.

Cells 115 may extend through from one end surface 114 to the other end surface 116. Further, the cells 115 may be arranged such that first cells sealed on one end surface 114 and opening on the other end surface 116, and second cells opening on one end surface 114 and sealed on the other end surface 116, are alternately arranged adjacent to each other with the partition walls 113 interposed therebetween.

The material of the ceramic formed body 100 is not particularly limited as long as it is porous ceramics. However, when using the metal-impregnated ceramic fired body as a heat exchanger, filter or catalyst carrier, it preferably comprises at least one selected from carbides such as silicon carbide, tantalum carbide and tungsten carbide, and nitrides such as silicon nitride and boron nitride, and more preferably comprises silicon carbide. The ceramic formed body 100 may contain only one type of ceramic component, or may contain two or more types in combination. The ceramic formed body 100 preferably contains 50% by mass or more, more preferably 70% by mass or more, and even more preferably 90% by mass or more of silicon carbide in the ceramic component.

A method of preparing the ceramic formed body 100 having the honeycomb structure portion 110 will be described. The ceramic formed body 100 having the honeycomb structure portion 110 can be manufactured according to a known honeycomb structure manufacturing method. For example, first, a binder, a surfactant, a pore-forming material, water, etc. are added to silicon carbide powder to prepare a forming raw material. Metallic silicon powder may be added to the forming raw material as required.

Next, after kneading the obtained forming raw material to form a green body, the green body is extrusion molded to prepare an undried ceramic formed body having the honeycomb structure portion. For extrusion molding, a die having a desired overall shape, cell shape, partition wall thickness, cell density, etc. can be used.

Next, by drying the obtained undried ceramic formed body, a ceramic formed body having the honeycomb structure portion 110 is obtained. In the drying step, conventionally known drying methods such as hot wind drying, microwave drying, dielectric drying, reduced pressure drying, vacuum drying, and freeze drying can be used. When sealing portions are necessary, they can be formed by forming the sealing portions at predetermined positions on both end surfaces of the dried ceramic formed body and then drying the sealing portions.

In step 1, the ceramic formed body thus obtained is brought into contact with a metal in the form of granules. This is for impregnating the ceramic formed body in step 2. The ceramic formed body to be processed in step 1 may be the one before degreasing, the one after degreasing, or the one further fired after degreasing. However, from the viewpoint of production efficiency, energy cost, and the like, it is preferable to perform step 1 on a ceramic formed body before degreasing.

As used herein, the term "granules" refers to powders, grains, or a mixture of both, and refers to an aggregate of particles having a volume-based median diameter (D50) of 5000 μm or less when the particle size distribution is measured by a laser diffraction method. The lower limit of the median diameter of the metal in the form of granules is preferably 100 μm or more, more preferably 200 μm or more, and even more preferably 800 μm or more. By increasing the median diameter of the metal in the form of granules, it becomes easier to suppress strong adhesion of deposit derived from the metal in the form of granules to the surface of the ceramic formed body during impregnation. Further, the upper limit of the median diameter of the metal in the form of granules is preferably 3000 μm or less, more preferably 2000 μm or less, and even more preferably 1000 μm or less. Therefore, the median diameter of the metal in the form of granules is, for example, preferably 100 to 3000 μm, more preferably 200 to 2000 μm, even more preferably 800 to 1000 μm.

There are no particular restrictions on the type of metal in the form of granules. However, it preferably comprises one or more selected from metallic silicon, molybdenum, tungsten, beryllium, chromium, iron, aluminum, nickel, manganese, silver, copper, vanadium, cobalt, tantalum, niobium, titanium, and magnesium, and more preferably comprises metallic silicon. The metal in the form of granules may contain only one type of metal, or may contain two or more types in combination. The metal in the form of granules may contain a single metal, or may contain an alloy. In addition, in order to increase the fluidity during weighing, prevent excessive contact between particles constituting the granules when placed, and improve removability, about 30% by mass or less of auxiliary agents may be contained with respect to the metal in the form of granules. Desirable auxiliary agents include sugars having 20 or less carbon atoms, carbon, and the like. In particular, when the ceramic formed body contains silicon carbide, it is preferable that the metal in the form of granules contain metallic silicon. The metal in the form of granules preferably contains 50% by mass or more, more preferably 70% by mass or more, and even more preferably 90% by mass or more of metallic silicon in the metal in the form of granules. Preferably, metallic silicon may be contained in an amount of 99% by mass or more.

It is not necessary that the entire amount of the metal in the form of granules prepared in step 1 is in contact with the ceramic formed body, and only a part thereof may be in contact. This is because when the metal in the form of granules is melted in the step 2, it gradually permeates into the inside of the ceramic formed body due to capillary action. The amount of metal in the form of granules may be appropriately set in consideration of the pore volume inside the ceramic formed body during firing, but it is preferably 50% or more, preferably 70% or more, and even more preferable 90% or more of the pore volume. As to the upper limit, when it is set to 120% or less, preferably 110% or less, and more preferably 105% or less, the formation of deposit after impregnation can be suppressed, and a situation in which the impregnation amount becomes excessive can be avoided.

There is no particular restriction on the location where the metal in the form of granules is brought into contact with the ceramic formed body 100. For example, when the ceramic formed body 100 has the honeycomb structure portion 110, one or more locations selected from the outer peripheral wall 112, the one end surface 114, the other end surface 116, and the cells 115 can be brought into contact with the metal in the form of granules. As a method for disposing the metal in the form of granules in the cells 115 of the ceramic formed body 100, a method of choosing powder having a particle size smaller than that of the opening of the cells 115 and pouring the metal in the form of granules into the cells 115 using an instrument such as a funnel can be used. Moreover, regardless of whether or not the ceramic formed body 100 has the honeycomb structure portion 110, when it has a hollow portion 117 extending from one end surface to the other end surface, inner peripheral wall 119 facing the hollow portion 117 may be brought into contact with the metal in the form of granules.

Before or after the operation of bringing the ceramic formed body 100 into contact with the metal in the form of granules, it is preferable to place the ceramic formed body 100 on a jig having a mounting surface. When the ceramic formed body 100 has the honeycomb structure portion 110, it is preferable to place the ceramic formed body 100 on a jig having a mounting surface so that the direction in which the cells 115 extend is parallel to the vertical direction before the operation of contacting the metal in the form of granules. Further, regardless of whether or not the ceramic formed body 100 has the honeycomb structure portion 110, when it has the hollow portion 117 extending from one end surface to the other end surface, it is preferable to place the ceramic formed body 100 on a jig having a mounting surface so that the direction in which the hollow portion 117 extends is parallel to the vertical direction before the operation of contacting the metal in the form of granules. In this state, if the metal in the form of granules is placed in the hollow portion 117, it is easy to prevent the metal in the form of granules from spilling or scattering outside the jig, so the ceramic formed body 100 can be efficiently impregnated.

The above-mentioned jig preferably has a wall surface surrounding the mounting surface so as to prevent the metal in the form of granules from spilling out of the jig and to prevent the ceramic formed body 100 from slipping off the jig. The height $H_1$ of the wall surface from the mounting surface may be appropriately set, and there is no particular limitation. However, in view of the fact that it is desirable to improve the loading efficiency of the ceramic formed bodies 100 on a kiln tool and not to hinder the gas flow in the furnace during firing, assuming $H_2$ is the height of the ceramic formed body 100 placed on the mounting surface (refers to the highest part of the ceramic formed body 100 with respect to the mounting surface), it is preferable that $H_1/H_2 \leq 1.0$, more preferable that $H_1/H_2 \leq 0.9$, even more preferable that $H_1/H_2 \leq 0.8$, and even more preferable that $H_1/H_2 \leq 0.5$. On the other hand, from the viewpoint of preventing the metal in the form of granules from spilling out of the jig and preventing the ceramic formed body 100 from slipping off the jig, it is preferable that $0.05 \leq H_1/H_2$, more preferable that $0.1 \leq H_1/H_2$, even more preferable that $0.2 \leq H_1/H_2$. Therefore, for example, it is preferable that $0.05 \leq H_1/H_2 \leq 1.0$, more preferable that $0.1 \leq H_1/H_2 \leq 0.9$, and even more preferable that $0.2 \leq H_1/H_2 \leq 0.8$.

It is preferable that the above jig has excellent heat resistance. Therefore, as the material of the jig, for example, one or more selected from carbon (graphite or the like), silicon carbide, boron nitride, tantalum carbide, alumina, and platinum is preferably contained in a total of 80% by mass or more, more preferably 90% or more, and even more preferably 95% or more.

Moreover, it is preferable that the mounting surface of the jig is coated with a coating layer containing a material that is inert to all of the material that constitutes the mounting surface, the material that constitutes the ceramic formed body, and the metal in the form of granules, such as a coating layer containing, for example, boron nitride and/or tantalum carbide. Similarly, it is also preferable that the inner wall surface of the jig is coated with a coating layer containing a material that is inert to all of the material that constitutes the mounting surface, the material that constitutes the ceramic formed body, and the metal in the form of granules, such as a coating layer containing, for example, boron nitride and/or tantalum carbide.

Figure 3:
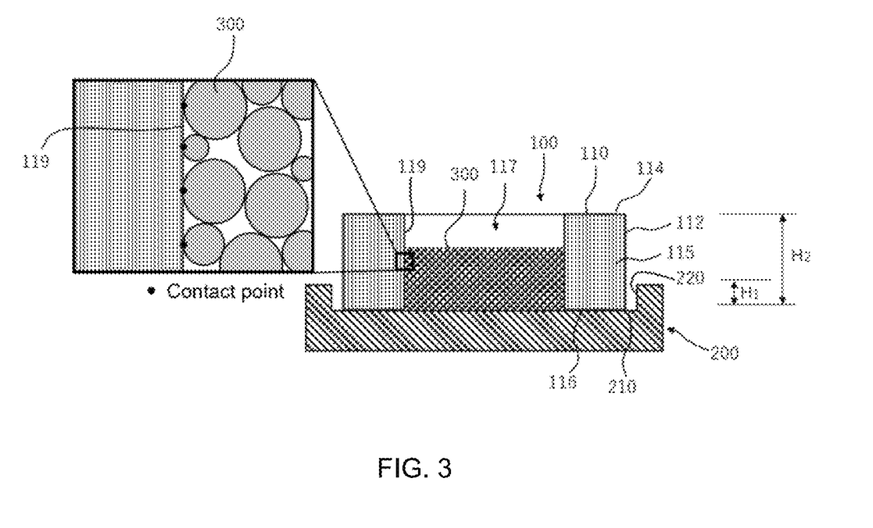
FIG. 3 shows a schematic side cross-sectional view and a partially enlarged view showing a state in which a ceramic formed body is placed on a mounting surface of a jig.

FIG. 3 shows a schematic side sectional view and a partially enlarged view thereof illustrating a state in which a ceramic formed body 100 having a hollow portion 117 and a honeycomb structure portion 110 was placed on a mounting surface 210 of a jig 200 having the mounting surface 210 and a wall surface 220 such that the directions in which the cells 115 and the hollow portion 117 extend are parallel to the vertical direction. The metal 300 in the form of granules is placed in the hollow portion 117. The metal 300 in the form of granules is in contact with the inner peripheral wall 119 of the ceramic formed body 100.

In the partially enlarged view of FIG. 3, the contact point between the metal 300 in the form of granules and the inner peripheral wall 119 of the ceramic formed body 100 is schematically depicted. It can be understood that the larger the particle size of the metal 300 in the form of granules is, the greater the distance between the contact points is, and the more likely a gap is formed between the metal 300 in the form of granules and the inner peripheral wall 119 of the ceramic formed body 100. Therefore, it can be understood that by increasing the particle size of the metal 300 in the form of granules, the adhesion between the metal 300 in the form of granules and the inner peripheral wall 119 of the ceramic formed body 100 can be reduced. In addition, it has been found that decomposition gas of organic matter such as a binder reacts with the metal 300 in the form of granules during firing to form a shell on the surface, and the shell maintains its shape to some extent even after the metal is melted. Therefore, by performing the step 2, which will be described later, even if excessive metal 300 in the form of granules adheres to the surface of the inner peripheral wall 119, or a reaction product such as that of metallic silicon and furnace gas is generated and adheres to the surface of the inner peripheral wall 119, the metal 300 in the form of granules can be easily removed. The specific particle size of the metal 300 in the form of granules is as described above.

(Step 2)

In the step 2, the metal 300 in the form of granules is heated at or above the melting point thereof in a state where the metal 300 in the form of granules is in contact with the ceramic formed body 100, so that the ceramic formed body is fired while the metal 300 is impregnated into the ceramic formed body, thereby obtaining a metal-impregnated ceramic fired body. In the case where the ceramic formed body 100 has not yet been degreased, it is possible to efficiently manufacture a metal-impregnated ceramic fired body by continuously performing degreasing and firing. The firing furnace to be used is not particularly limited, but an electric furnace, a gas furnace, or the like can be used.

The step 2 is preferably performed with the ceramic formed body 100 placed in a jig having a mounting surface. This is to prevent the melted metal in the form of granules from flowing out without being used for impregnation. For example, when the ceramic formed body 100 has a hollow portion 117 extending from one end surface to the other end surface, it is preferable to perform the step 2 with the ceramic formed body 100 placed on the mounting surface of the jig having the mounting surface such that the direction in which the hollow portion 117 extends is parallel to the vertical direction. Further, when the ceramic formed body 100 has the honeycomb structure portion 110, it is preferable to perform the step 2 with the ceramic formed body 100 placed on the mounting surface of the jig having the mounting surface such that the direction in which the cells 115 extend is parallel to the vertical direction.

Conditions for the degreasing, for example, the atmosphere, temperature, and time may be appropriately set according to the type and amount of forming aids contained in the ceramic formed body, and the loading amount per kiln, but it must be at least the decomposition temperature of the forming aids. Conditions for the firing, for example, the atmosphere, temperature, and time may be appropriately set according to the type of ceramics contained in the ceramic formed body, but it must be at least the melting point of the metal in the form of granules. Assuming that the melting point of the metal for impregnation is M ° C., and the maximum temperature during heating in the step 2 is T1° C., for example, it is preferable that $M \leq T1 \leq M+300$, more preferably $M+20 \leq T1 \leq M+200$, and even more preferably $M+40 \leq T1 \leq M+150$. However, even within this range, the temperature should be lower than the firing temperature of the ceramics forming the ceramic formed body. For example, when the ceramic formed body contains silicon carbide and metallic silicon is used as the metal for impregnation, the maximum temperature T1 is preferably 1420 to 1720° C., more preferably 1440 to 1620° C., and even more preferably 1460 to 1570° C. The metal in the form of granules heated to the melting point or higher melts and enters the pores in the ceramic formed body one after another due to capillary action, thereby realizing the impregnation. After heating, the metal-impregnated ceramic fired body is cooled to room temperature.

The porosity of the metal-impregnated ceramic fired body decreases as the impregnation amount increases. The porosity of the metal-impregnated ceramic fired body is preferably 30% or less, more preferably 20% or less, and even more preferably 10% or less, in order to ensure strength and thermal conductivity. The metal-impregnated ceramic fired body may have a porosity of 0%. The porosity is measured by the open porosity measurement method (Archimedes method) specified in JIS R1634:1998, but when the porosity exceeds 10%, it is measured by the mercury intrusion method in accordance with JIS R1655:2003.

When the metal-impregnated ceramic fired body has a honeycomb structure portion, the cell density (the number of cells per unit area) in the cross-section perpendicular to the direction in which the cells extend is not particularly limited, but is preferably 4 to 320 cells/cm$^2$. By setting the cell density to 4 cells/cm$^2$ or more, the strength of the partition walls 113, and the strength and effective GSA (geometric surface area) of the metal-impregnated ceramic fired body itself can be sufficiently ensured. Further, by setting the cell density to 320 cells/cm² or less, it is possible to suppress an increase in pressure loss when a fluid flows through the cells. The cell density is calculated by dividing the number of cells in the honeycomb structure portion of the metal-impregnated ceramic fired body by the area of one end surface excluding the hollow portion, the outer peripheral wall and the inner peripheral wall.

The thickness of the partition walls 113 is not particularly limited, but it is preferably 0.1 to 1.0 mm, more preferably 0.2 to 0.6 mm, when the metal-impregnated ceramic fired body is used as a heat exchanger. By setting the thickness of the partition walls 113 to 0.1 mm or more, the mechanical strength of the metal-impregnated ceramic fired body can become sufficient. In addition, by setting the thickness of the partition walls 113 to 1.0 mm or less, it is possible to suppress problems such as an increase in pressure loss when a fluid is caused to flow through the cells 115 due to the decrease in the opening area, and a decrease in heat recovery efficiency due to the decrease in the contact area with the fluid.

The thicknesses of the outer peripheral wall 112 and the inner peripheral wall 119 are not particularly limited, but are preferably larger than the thickness of the partition walls 113. With such a configuration, it is possible to increase the strength of the outer peripheral wall 112 and the inner peripheral wall 119, which are likely to break (for example, cracks, fractures, or the like) due to thermal stress caused by the temperature difference between the fluids. The thicknesses of the outer peripheral wall 112 and the inner peripheral wall 119 are not particularly limited, and may be appropriately adjusted depending on the application. For example, the thickness of the outer peripheral wall 112 and the inner peripheral wall 119 is preferably 0.3 mm to 10 mm, more preferably 0.5 mm to 5 mm, and even more preferably 1 mm to 3 mm, when the metal-impregnated ceramic fired body is used for general heat exchange applications. Further, when the metal-impregnated ceramic fired body is used for heat storage applications, the outer peripheral wall 112 may have a thickness of 10 mm or more to increase the heat capacity of the outer peripheral wall 112.

EXAMPLES

The following examples are provided for a better understanding of the invention and its advantages, but are not intended to limit the scope of the invention.

(1. Preparation of Cylindrical Green Body)

Forming aids such as a binder and a pore-forming material were added to silicon carbide (SiC) powder, and water was added to obtain a forming raw material. Then, the forming raw material was kneaded by a vacuum kneader to prepare a cylindrical green body.

(2. Preparation of Ceramic Formed Body)

The obtained cylindrical green body was formed using an extruder having a predetermined die structure, and a hollow cylindrical undried ceramic formed body having a honeycomb structure was obtained, such that each cell shape in the cross-section perpendicular to the direction in which cells extended was partitioned by a pair of linear partition walls extending from the center side toward the outer periphery side, and a pair of concentric arc partition walls, as shown in FIG. 2. This undried ceramic formed body was dried at 120° C. for 12 hours or more using a hot air dryer, and both end surfaces were cut in a predetermined amount. As a result, a required of number of hollow cylindrical dried ceramic formed bodies of height 25 mm, inner diameter 66 mm, and outer diameter 86 mm were prepared for the following tests.

(3. Impregnation and Firing)

The dried hollow cylindrical ceramic fired body prepared above was placed concentrically on the mounting surface of a jig made of carbon so that the direction in which the hollow portion and the cells extended were parallel to the vertical direction. This jig had a circular shape in a plan view, and had a wall surface erected so as to surround the mounting surface. Assuming that the height of the wall surface from the mounting surface is $H_1$ and the height of the ceramic formed body in the state of being placed on the mounting surface is $H_2$, $H_1/H_2$ was 0.5. In addition, the mounting surface and the inner wall surface of the jig were coated with a coating layer containing boron nitride.

Next, metallic silicon powder having various different median diameters (D50) according to the test numbers was placed in the hollow portion of the hollow cylindrical ceramic formed body placed on the jig. The median diameter (D50) of the metallic silicon powder was measured with a laser diffraction particle size distribution analyzer (model LA960) manufactured by HORIBA. The mass of the metallic silicon powder placed in any test number was 50 parts by mass when the mass of the ceramic formed body was 100 parts by mass. Table 1 shows the median diameter (D50) of the metallic silicon powder according to each test number.

Next, the hollow cylindrical ceramic formed body placed on the jig was put into a firing furnace and degreased under the heating conditions of 600° C. for 24 hours in a nitrogen atmosphere. After degreasing, the temperature was raised without cooling, and impregnation and firing were performed under the heating conditions of 1500° C.×2 hours in an argon atmosphere. After firing, the Si-impregnated silicon carbide fired body was cooled to room temperature and taken out from the firing furnace.

The obtained Si-impregnated silicon carbide fired body according to each test example had the following specifications.

Overall shape: hollow cylindrical shape with a height of 25 mm, an inner diameter of 66 mm, and an outer diameter of 86 mm Peripheral wall thickness: 2 mm Inner peripheral wall thickness: 2 mm Cell density: 56 cells/cm²

Partition wall thickness: 0.3 mm

Porosity: 5%

(4. Removal of Deposits)

On the surface of the inner peripheral wall of the Si-impregnated silicon carbide fired body obtained according to each test example, deposits derived from the metallic silicon powder placed in the hollow portion were observed. A metal spatula was applied with a force of about 0.1 N to rub the deposit spread over an area of about 18 cm² for ten and several times to investigate how much the deposit could be removed. The removability of deposit was evaluated according to the following criteria. The results are shown in Table 1.

Easy: deposit removal rate was 95 area % or more

Acceptable: deposit removal rate was 50 area % or more and less than 95 area %

Difficult: deposit removal rate was less than 50 area %

TABLE 1

| Test number | Metallic silicon powder median diameter (D50) (μm) | Removability of deposit |
| --- | --- | --- |
| 1 | 800 | Easy |
| 2 | 200 | Easy |
| 3 | 100 | Acceptable |
| 4 | <75 | Difficult |

In all tests, not only was it possible to omit the work of forming the impregnating metal supply body, but also the amount necessary for impregnation could be easily adjusted. In addition, since it is not necessary to place the metallic silicon powder on the ceramic formed body, it can be understood that the loading efficiency on the kiln tool is improved. Furthermore, from the results in Table 1, it can be understood that when the particle size of the metallic silicon powder is 100 μm or more, the removability of deposit was significantly improved, and when it was 200 μm or more, the removability of deposit was remarkably improved.

DESCRIPTION OF REFERENCE NUMERALS

100: Ceramic formed body
110: Honeycomb structure portion
112: Outer peripheral wall
113: Partition wall
113a: Partition wall surface
113b: Partition wall surface
114: End surface
115: Cell
116: End surface
117: Hollow portion
119: Inner peripheral wall
200: Jig
210: Mounting surface
220: Wall surface
300: Metal

The invention claimed is:

1. A method for manufacturing a metal-impregnated ceramic fired body, comprising:
   a step 1 of contacting a ceramic formed body with a metal in a form of granules,
   a step 2 of heating the metal at or above a melting point thereof in a state where the metal in the form of granules is in contact with the ceramic formed body so that the ceramic formed body is fired while the metal is impregnated into the ceramic formed body, thereby obtaining a metal-impregnated ceramic fired body,
   wherein the ceramic formed body comprises a honeycomb structure portion having an outer peripheral wall and partition walls disposed on an inner peripheral side of the outer peripheral wall and partitioning a plurality of cells forming flow paths from one end surface to another end surface, and
   wherein the step 1 comprises disposing the metal in the form of granules in the cells of the ceramic formed body.

2. The method according to claim 1, wherein the metal in the form of granules has a volume-based median diameter (D50) of 100 μm or more when the particle size distribution is measured by a laser diffraction method.

3. The method according to claim 1, wherein the metal-impregnated ceramic fired body has a porosity of 30% or less.

4. The method according to claim 1, wherein the ceramic formed body comprises a hollow portion extending from the one end surface to the other end surface, and the step 1 comprises disposing the metal in the form of granules in the hollow portion of the ceramic formed body.

5. The method according to claim 4, wherein the step 2 is performed in a state where the ceramic formed body is placed on a mounting surface of a jig comprising the mounting surface such that a direction in which the hollow portion extends is parallel to a vertical direction.

6. The method according to claim 1, wherein the step 2 is performed in a state where the ceramic formed body is placed on a mounting surface of a jig comprising the mounting surface such that the direction in which the cells extend is parallel to a vertical direction.

7. The method according to claim 1, wherein the ceramic formed body comprises silicon carbide, and the metal in the form of granules comprises metallic silicon.

8. The method according to claim 1, wherein the metal-impregnated ceramic fired body is a heat exchanger.

* * * * *